United States Patent Office 2,755,886
Patented July 24, 1956

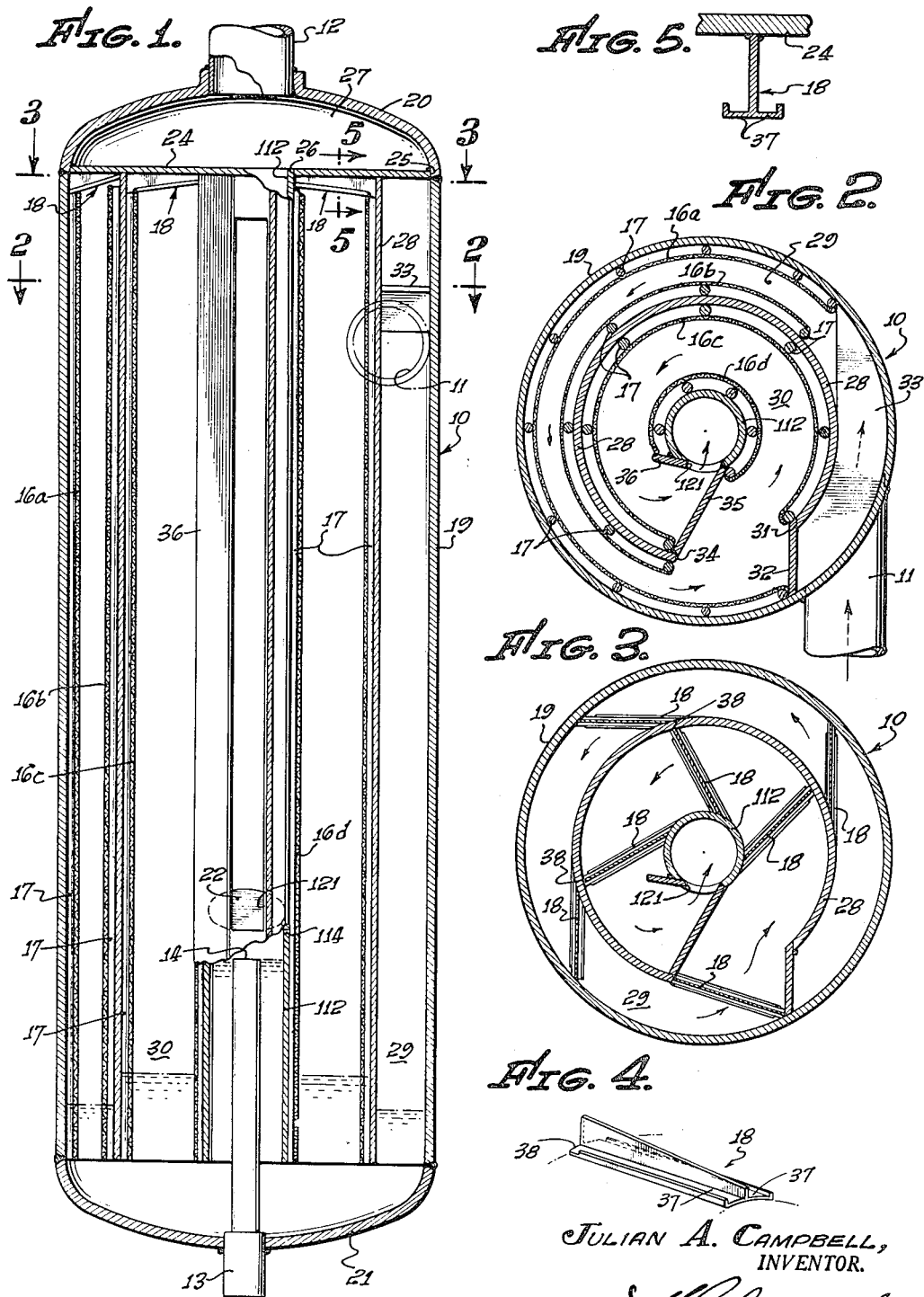
Julian A. Campbell, INVENTOR.

2,755,886
FLUID SEPARATORS
Julian A. Campbell, Long Beach, Calif.
Application September 27, 1954, Serial No. 458,596
13 Claims. (Cl. 183—85)

This invention relates to improved separators for removing contaminants from fluid streams, and particularly for removing liquid contaminants, such as oil or water, from a flow of gas, air, or steam. The present devices are in certain respects improvements on the separator shown in my Patent No. 2,511,967, issued June 20, 1950, on "Gas and Liquid Separator."

A separator embodying the invention includes a shell having a vertically extending and preferably cylindrical side wall, and through which a primary fluid (usually a gas) flows along a generally circular course, in a manner centrifugally separating liquid contaminants from the primary fluid. The fluid may leave the shell through a vertically extending outlet tube at the center of the shell. Desirably, the fluid is confined for an essentially spiraling course of travel radially inwardly from a fluid inlet to the central outlet tube.

After the contaminants have been centrifugally separated from the primary fluid, the contaminants fall downwardly along the walls defining their circular course of flow and into a bottom portion of the shell. In accordance with my above mentioned patent, I find it desirable to provide, adjacent these walls, a screen or screens, which may be positioned in closely spaced relation to the walls in a manner forming between the screen and walls a narrow vertical space, along which the separated contaminants may flow downwardly while being protected by the screen from contact with the rapidly moving primary fluid. The circular advancement of liquid along this narrow space may be prevented by positioning in the space a series of vertically extending rods or members, which may serve the additional function of attaching the screen to the adjacent walls. Also, a similar screen or screens may be provided along the inner side of the fluid path, as well as along the outer side.

One difficulty which has heretofore been encountered with separators of the above general type has been a tendency for some of the contaminating liquid to settle out on the underside of the top wall of the shell, and to be gradually advanced along that wall toward the outlet, to ultimately discharge with the otherwise cleaned primary gas. As will be understood, such a tendency for advancement of the liquid along the top wall has been caused by the rapid movement of the gas along the underside of that top wall, the gas tending to carry the liquid with it.

The general object of the present invention is to provide means in a separator of the above type for preventing such advancement or "creeping" of the contaminating liquid along the top wall of the device and toward the gas outlet. For this purpose, I provide one or a series of baffles which project downwardly from the top wall at its underside, and are disposed across the path of fluid flow in a manner intercepting and stopping any advancing liquid. Along the bottom of each of these baffles, there may be provided a channel for catching any liquid which contacts and falls downwardly along the baffle.

This channel may be inclined downwardly as it extends radially outwardly, to conduct the separated liquid outwardly toward the wall at the outer side of the fluid path. The baffles and channels may extend through the previously mentioned screening, to deliver the liquid to the spaces between the screening and adjacent wall surfaces. Preferably, the baffles and channels advance circularly as they extend radially outwardly, to thus further enhance radially outward flow of liquid along the baffles and channels.

The above and other features and objects of the present invention will be better understood from the following detailed description of the typical embodiment illustrated in the accompanying drawing, in which:

Fig. 1 is a vertical section through a separator constructed in accordance with the invention;

Figs. 2 and 3 are horizontal sections taken on lines 2—2 and 3—3 respectively of Fig. 1;

Fig. 4 is a perspective view of one of the top baffle members of the Fig. 1 device; and Fig. 5 is an enlarged fragmentary vertical section through one of the top baffle members, and taken on line 5—5 of Fig. 1.

The device shown in the drawing is especially adapted for separating liquid from a gas stream, as for instance for removing entrained water or oil from a flow of steam. The device includes an outer shell 10, into which the gas flow in introduced through an inlet 11, and from which the cleaned gas leaves through an outlet tube 12. The liquid separated from the gas falls to the bottom of shell 10, and is accumulated at that location, ultimately to be drained off through an overflow drain line 13 which acts to maintain the maximum liquid level in the shell at the height of the upper open end 14 of that drain line. The gas is directed along an essentially inwardly spiraling course within shell 10, by virtue of suitable baffles or walls including a circularly extending wall 28 located between the side wall of the shell and the inner tube 12. Extending along the various walls of the fluid passages in the shell, and in closely spaced relation to those walls, there are provided a number of screens 16a, 16b, 16c, and 16d, which are held in place and in spaced relation to the walls by means of a number of vertically extending rods 17. The present invention is particularly concerned with the provision at the upper end of the shell 10 of a number of top baffles 18, for preventing advancement or "creepage" of separated liquid along the top wall of the device.

The shell 10 includes a cylindrical vertically extending side wall 19, which is closed at its top and bottom by dome shaped end walls 20 and 21. Inlet line 11 is connected into side wall 19 near its upper end, and directs incoming gases horizontally into the shell, and tangentially with respect to the cylindrical shell wall 19. Outlet line 12 connects into the center of upper wall 20 of the shell. A central tubular outlet chamber 112 extends vertically within the shell, and concentrically with respect to side wall 19 of the shell, and forms in effect a lower continuation of outlet line 12, chamber 112 being directly beneath and spaced from line 12. Chamber 112 has a vertically extending opening 121 in its side extending along most of the vertical extent of the separator, and into which the cleaned gases flow for passage upwardly through outlet tube 12. The lower end of chamber or tube 112 extends about drain line 13. At a location spaced a short distance above drain line 13, outlet chamber 112 contains an essentially horizontal imperforate baffle or bottom wall 22; which may be inclined slightly, say about 15°, in a direction to drain any small amount of liquid in chamber 112 laterally through the slot or opening 121 to fall to the bottom of the shell. Preferably, the lowermost edge of opening 121 is alined with an adjacent lowermost portion of baffle 22. At a location slightly beneath baffle 22, the cylindrical side wall of the tube which forms chamber 112 may contain small openings 114, to equalize the pressure at the inside and outside of the lower portion of the tube 112, so that the liquid level within that tube may be maintained at the upper end of drain line 13.

Spaced beneath the upper wall 29 of the shell, a horizontal annular wall 24 is provided, the outer and inner edges 25 and 26 of which are continuously welded or otherwise sealed to the shell wall and outlet chamber 12 respectively, so that wall 24 acts as the upper wall of the main fluid receiving space within the shell.

The inner wall 28 is cylindrical and extends vertically, and is concentric with outer shell wall 19 and outlet chamber 112. Wall 28 is spaced annularly from both the outer shell wall and outlet chamber 112, to form outer and inner circularly extending passages 29 and 30. Wall 28 commences at an edge 31 adjacent inlet tube 11, with the space between that edge and outer wall 19 being closed by a vertically and essentially radially extending baffle or wall 32. The gases introduced through inlet 11 are thus confined for flow circularly along outer path 29, between walls 19 and 28, and in a counter-clockwise direction as seen in Fig. 2. Opposite inlet 11, an essentially horizontal but downwardly deflected baffle 33 extends across path 29, to deflect the gases somewhat downwardly as they follow their circular course.

Wall 28 terminates at a vertically extending edge 34, which is connected by an imperforate vertically extending baffle 35 with the wall of tube 112 at a location along a side of outlet opening 121, so that the gases flow from the end of outer passage 29 into inner passage 30, to flow circularly thereabout and ultimately into outlet pipe 12 through opening 121. Adjacent opening 121, outlet tube 112 may carry a vertical angularly extending baffle 36, for defining with wall 35 a converging throat leading the gases into the outlet tube.

As the gases follow the above defined essentially spiral path within shell 10, any liquid contained in the gases is separated therefrom, primarily as a result of the centrifugal forces tending to cause the liquid to accumulate on the inner surfaces of walls 19 and 28. Some small amount of liquid is also accumulated on the outer surfaces of these walls and on the outer surface of outlet tube 112. The liquid thus separated out falls downwardly along the various walls defining the gas path, and as it falls downwardly is protected by screens 16a, 16b, 16c and 16d against re-entrainment in the rapidly moving gases. These screens, which extend cylindrically in closely spaced relation to walls 19, 28 and 112, define with those walls narrow liquid accumulation spaces, which are rather well protected against contact with the rapidly moving gases in the shell, and within which the separated liquid is able to fall downwardly along the wall surfaces without being re-entrained. Screens 16a, 16b, 16c and 16d may be of conventional woven wire construction, typically being about 14 mesh. These screens are desirably mounted to the various vertically extending walls of the device by means of a number of vertically extending rods 17, which are welded or otherwise rigidly secured to the walls, and are in continuous engagement with the walls along the entire vertical extents of the rods. The screens may be attached to rods 17 in any suitable manner, as by welding.

In addition to serving as mounting elements for screens 16a, 16b, 16c and 16d, rods 17 act as vertical baffles which are engaged by any separated liquid which may tend to advance circularly along the various vertical walls of the device. These rods acts to interrupt any such circular advancement of the liquid, and very effectively require that the liquid fall downwardly along the walls and to the bottom of the shell. Wall 28, screens 16a, 16b, 16c and 16d, rods 17, and baffles 32, 35 and 36 all extend upwardly to points of connection with top wall 24 (except for certain of the rods 17 which may be located adjacent the later to be described top baffles 18). At their lower ends, these various parts 12, 28, 16a, 16b, 16c, 16d, 17, 32, 35 and 36 terminate well below the lowest liquid level in the bottom of the chamber. As will be understood, liquid drained downwardly from both the outer passage 29 and the inner passage 30 is in communication with drain line 13, for discharge therethrough. It is also noted that, because the pressure in the shell progressively decreases toward the center of the shell (i. e. in the direction of gas flow), the liquid level in inner passage 30 is higher than that in outer passage 29, and is lower than that in the innermost tube 112.

The top baffles 18 project directly downwardly from top wall 24 at a number or circularly spaced locations along the path of gas flow through the device (see Fig. 3). Each of these baffles 18 extends entirely across the horizontal extent of one of the fluid passages 29 or 30, that is, each of the baffles extends either from wall 28 outwardly to wall 19, or from outlet pipe 112 outwardly to wall 28. Also, each baffle 18 is continuously welded or otherwise attached in fluid-tight relation to both of the walls 28 and 19, or 112 and 28, between which it extends, and is continuously welded or otherwise secured in fluid-tight relation to the top wall 24. Thus, no fluid can pass baffles 18 except by flowing past their bottom edges.

Each of the baffles 18 carries along its bottom edge a pair of oppositely directed upwardly facing fluid-receiving channel elements 37, which act to receive any liquid falling downwardly along baffles 18, and conduct that liquid radially outwardly to either the wall 19 or wall 28. These channels 37 are inclined downwardly as they extend radially outwardly, to thus assure such radially outward movement of any collected liquid. Also, baffles 18 and channels 37 advance circularly in the direction of fluid flow as they extend radially outwardly, to further assure the radially outward movement of any collected liquid.

At their ends, the vertical baffles 18 extend through breaks or interruptions formed in screening 16a, 16b, 16c or 16d. Similarly channels 37 may at their inner ends extend through the screens and into engagement with tube 112 or wall 28. At their outer ends, channels 37 may extend through suitable interruptions in the screens, but may terminate at 38 in spaced relation to wall 28 or wall 19, to allow flow of liquid from the channels onto walls 28 or 19 for passage downwardly therealong. If any of the rods 17 is positioned directly beneath an end of one of the top baffles 18, that rod is terminated at the lower edge of the baffle, rather than extending upwardly to the top wall 24.

To now discuss the operation of the illustrated separator, when gases are introduced tangentially into shell 10 through inlet 11, the gases spiral horizontally through passage 29 and then passage 30, and then ultimately enter outlet tube 112 for discharge upwardly therethrough. During such spiraling of the gases, any entrained liquid is centrifugally separated from the gases, and accumulates in large part along the inner surfaces of walls 19 and 28. The liquid thus separated falls downwardly along these walls within the relatively quiescent areas provided by screens 16a and 16b, and accumulates within the bottom of the shell for drainage through outlet line 13. Any small amount of liquid which may accumulate along the outer surfaces of wall 28 and outlet tube 12 falls downwardly along the outer surfaces of these elements, also being protected by the screens. As previously mentioned, rods 17 prevent the circular advancement of accumulated liquid along any of the vertical wall surfaces and toward outlet opening 121.

The downwardly projecting top baffles 18 are interposed across the path of any separated liquid which may tend to be swept circularly along the under-surface of top wall 24 and toward the outlet tube 112. When any such liquid engages one of these baffles, the baffle interrupts the circular advancement of the liquid along wall 24 and deflects the liquid downwardly into channels 37 for movement therealong radially outward toward wall 19 or wall 28. This liquid then falls downwardly along walls 19 or 28, along with the other separated liquid.

I claim:

1. A separator comprising a shell having an upwardly extending side wall, an inlet for introducing fluid into said shell, a fluid outlet tube extending generally vertically at a generally central location in said shell, a vertically extending inner wall within the shell having a portion radially between and spaced from said side wall and tube and defining therewith a gas path essentially spiralling inwardly from said inlet to the outlet tube, said path having a first portion formed between said side wall and inner wall and having a second portion continuing from said first portion and formed between said inner wall and said outlet tube, screening extending essentially vertically along said side wall and said inner wall in closely spaced relation thereto, said shell having a top wall defining the top of said path and having a bottom portion into which centrifugally separated liquid contaminants fall downwardly from the spaces between said walls and screening, and a plurality of baffles projecting downwardly from said top wall at locations spaced along said spiral path and extending across said path to prevent liquid from advancing along said top wall toward the outlet, there being channels extending along lower portions of said baffles toward the sides of said path and adapted to receive said separated contaminants from the baffles and conduct them toward said walls to fall downwardly therealong.

2. A separator as recited in claim 1, in which said baffles extend substantially entirely across the upper ends of said path and connect at their opposite ends to said walls and said outlet tube.

3. A separator as recited in claim 1, in which said baffles extend substantially entirely across said path and outwardly through said screening to the space between said screening and said walls.

4. A separator as recited in claim 1, in which said baffles extend substantially entirely across said path and outwardly through said screening to the space between said screening and said walls, and said channels extend through said screening and are inclined downwardly as they advance outwardly toward said walls.

5. A separator as recited in claim 1, including screening extending generally vertically along the outer sides of said outlet tube and said inner wall in closely spaced relation thereto, and elonagted members extending vertically at circularly spaced locations between the screening and the adjacent inner and outer sides of said walls and tube.

6. A separator as recited in claim 5, in which said baffles extending entirely across said path and through the screening and connect at their opposite ends to said walls and outlet tube, said channels extending through the screening and being inclined downwardly as they advance outwardly toward said walls, said baffles and channels advancing circularly in the direction of gas flow as they extend radially outwardly.

7. A separator comprising a shell structure, an inlet for introducing fluid into said shell structure at a location to flow along a generally circular and generally horizontal path therein, an outlet through which the fluid then leaves the shell structure, said shell structure including essentially vertical wall means confining said fluid for flow along said path adjacent the wall means, screening extending along said wall in proximate relation thereto and acting to trap centrifugally separated liquid contaminants adjacent the wall means for flow downwardly therealong, said shell having a top wall defining the top of said generally circular path, a baffle extending downwardly from said top wall and disposed across said fluid path to prevent liquid from advancing circularly along the top wall, and a channel extending along a lower portion of said baffle toward a side of said path and adapted to receive said separated contaminants from the baffle and conduct them laterally to said side of the path and toward the location of said screening.

8. A separator as recited in claim 6, in which said channel is inclined downwardly in a direction toward a radially outer side of said path and conducts the contaminants toward the liquid downflow space between said wall means and screening.

9. A separator as recited in claim 7, in which said baffle extends radially outwardly through said screening and to a location adjacent said wall means.

10. A separator as recited in claim 9, in which said channel extends outwardly through said screening and to a location adjacent said side wall and is inclined downwardly as it advances toward the side wall.

11. A separator as recited in claim 7, in which said baffle and channel extend radially outwardly to a location adjacent the outer side of said path, and advance circularly in the direction of fluid flow as the baffle and channel extend outwardly toward said outer side of the path.

12. A separator as recited in claim 7, in which said baffle extends entirely across the upper end of said path, and opposite ends of said baffle extend into contact with said wall means at opposite sides of the path to prevent liquid creepage past the ends of the baffle.

13. A separator comprising a shell structure, an inlet for introducing fluid into said shell structure at a location to flow along a generally circular and generally horizontal path therein, an outlet through which the fluid then leaves the shell structure, said shell structure including essentially vertical wall means confining said fluid for flow along said path adjacent the wall means, screening extending along said wall in proximate relation thereto and acting to trap centrifugally separated liquid contaminants adjacent the wall means for flow downwardly therealong, said shell having a top wall defining the top of said generally circular path and a baffle extending downwardly from said top wall and disposed across said fluid path to prevent liquid from advancing circularly along the top wall, said baffle extending entirely across the upper end of said path, and opposite ends of said baffles extending into contact with said wall means at opposite sides of the path to prevent liquid creepage past the ends of the baffle.

References Cited in the file of this patent

UNITED STATES PATENTS

| | | |
|---|---|---|
| 361,232 | Ortman | Apr. 12, 1887 |
| 1,505,743 | Stebbins | Aug. 19, 1924 |
| 1,505,744 | Stebbins | Aug. 19, 1924 |
| 1,818,994 | Kreisinger | Aug. 18, 1931 |
| 2,511,967 | Campbell | June 20, 1950 |
| 2,604,957 | Williamson et al. | July 29, 1952 |

FOREIGN PATENTS

| | | |
|---|---|---|
| 12,867 | Great Britain | June 5, 1902 |